United States Patent
Yun et al.

(10) Patent No.: US 9,581,090 B2
(45) Date of Patent: Feb. 28, 2017

(54) ENGINE CONTROL UNIT FOR CONSTRUCTION MACHINERY

(71) Applicant: DOOSAN INFRACORE CO., LTD., Incheon (KR)

(72) Inventors: Hongcheol Yun, Gyeonggi-do (KR); Duckwoo Park, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 156 days.

(21) Appl. No.: 14/375,220

(22) PCT Filed: Jan. 22, 2013

(86) PCT No.: PCT/KR2013/000508
§ 371 (c)(1),
(2) Date: Nov. 4, 2014

(87) PCT Pub. No.: WO2013/115516
PCT Pub. Date: Aug. 8, 2013

(65) Prior Publication Data
US 2015/0107552 A1 Apr. 23, 2015

(30) Foreign Application Priority Data

Jan. 30, 2012 (KR) ........................ 10-2012-0008761

(51) Int. Cl.
*F02D 11/02* (2006.01)
*F02D 11/10* (2006.01)
(Continued)

(52) U.S. Cl.
CPC .............. *F02D 11/02* (2013.01); *B60K 26/02* (2013.01); *B60K 35/00* (2013.01); *B60K 37/06* (2013.01);
(Continued)

(58) Field of Classification Search
CPC ........ F02D 11/02; F02D 11/10; F02D 11/107; F02D 31/001; B60K 26/02; B60K 35/00;
(Continued)

(56) References Cited

U.S. PATENT DOCUMENTS

2005/0034915 A1* 2/2005 Kumazawa ............. B66C 13/56
180/331
2008/0117026 A1* 5/2008 Hupfer ................... B60K 35/00
340/10.6
(Continued)

FOREIGN PATENT DOCUMENTS

CN 102264983 A 11/2011
JP 2011-250344 12/2011
(Continued)

OTHER PUBLICATIONS

Search Report dated Apr. 23, 2013 and written in Korean with English translation for International Patent Application No. PCT/KR2013/000508 filed Jan. 22, 2013, 5 pages.
(Continued)

*Primary Examiner* — Erick Solis
(74) *Attorney, Agent, or Firm* — John D. Veldhuis-Kroeze; Westman, Champlin & Koehler, P.A.

(57) ABSTRACT

Provided is an engine control apparatus for construction machinery, including: an engine control dial manually operated by a user and configured to generate a control signal for increasing and decreasing revolutions per minute (rpm) of an engine by a predetermined unit; a jog shuttle including a jog switch, which is manually rotated and pressed by the user, and configured to generate a selection signal for selecting or changing functions corresponding to various operation modes; an instrument panel configured to display operation information of various elements which the user requires while driving the construction machinery; an engine controller configured to control the engine to respond to the
(Continued)

control signal generated by the engine control dial; and an equipment controller configured to receive either the control signal generated by the engine control dial or the control signal corresponding to the rotation and the press of the jog switch, and provide the engine controller with a value of an rpm of the engine corresponding to the received control signal among values of the rpms of the engine corresponding to the respective control signals.

4 Claims, 3 Drawing Sheets

(51) Int. Cl.
*F02D 31/00* (2006.01)
*B60K 35/00* (2006.01)
*B60K 37/06* (2006.01)
*B60W 50/08* (2012.01)
*B60K 26/02* (2006.01)

(52) U.S. Cl.
CPC ............ *B60W 50/085* (2013.01); *F02D 11/10* (2013.01); *F02D 31/001* (2013.01); *B60K 2026/028* (2013.01); *B60K 2026/029* (2013.01); *B60W 2300/17* (2013.01); *B60Y 2200/41* (2013.01); *F02D 2200/604* (2013.01)

(58) Field of Classification Search
CPC .............. B60K 37/06; B60K 2026/025; B60K 2026/028; B60K 2026/029; B60W 50/085

USPC .......... 123/361, 399, 339.13, 339.14, 339.15
See application file for complete search history.

(56) References Cited

U.S. PATENT DOCUMENTS

| | | | | |
|---|---|---|---|---|
| 2009/0140993 A1* | 6/2009 | Han | .................. | G06F 3/016 345/173 |
| 2011/0264338 A1* | 10/2011 | Park | .................. | E02F 9/2246 701/50 |
| 2012/0123657 A1* | 5/2012 | Taguchi | .................. | B60K 31/00 701/93 |
| 2012/0267222 A1* | 10/2012 | Gohng | .................. | G06F 3/016 200/61.54 |
| 2012/0326967 A1* | 12/2012 | Gohng | .................. | B60K 35/00 345/156 |
| 2015/0107552 A1* | 4/2015 | Yun | .................. | F02D 31/001 123/319 |

FOREIGN PATENT DOCUMENTS

| | | |
|---|---|---|
| JP | 2011-256603 | 12/2011 |
| KR | 10-2009-0063511 | 6/2009 |
| KR | 10-2011-0076533 | 7/2011 |
| KR | 10-2011-0117085 | 10/2011 |

OTHER PUBLICATIONS

Office Action issued in corresponding Chinese Patent Application No. 201380017815.4 dated Apr. 6, 2016.

* cited by examiner

| JOG SHUTTLE DIAL INPUT | |
|---|---|
| DIAL INPUT USE | ☑ ACTIVATION |
| CURRENT RPM OF ENGINE | 1928 |
| RPM DIAL SETTING | 55% |

ENGINE CONTROL UNIT FOR CONSTRUCTION MACHINERY

CROSS-REFERENCE TO RELATED APPLICATION

This Application is a Section 371 National Stage Application of International Application No. PCT/KR2013/000508, filed Jan. 22, 2013 and published, not in English, as WO 2013/115516 on Aug. 8, 2013.

FIELD OF THE DISCLOSURE

The present disclosure relates to an engine control apparatus for construction machinery, and more particularly, to an engine control apparatus for construction machinery, which is capable of controlling the number of revolutions of an engine by using a jog shuttle when an engine control dial controlling the number of revolutions of the engine has a problem or is erroneously operated.

BACKGROUND OF THE DISCLOSURE

In general, construction machinery uses an engine control apparatus in order to control the number of revolutions of an engine, and in the engine control apparatus, an engine control dial manually operated by a user inputs a corresponding control signal to an equipment controller which controls an engine controller controlling the engine, and the equipment controller receives a corresponding voltage value of the engine control dial to make the engine controller control the number of revolutions of the engine.

However, the engine control apparatus for the construction machinery cannot appropriately change the number of revolutions of the engine when the engine control dial has a problem or is erronesouly operated, so that the engine control apparatus needs to be driven in an emergency mode until a repair is performed.

Further, in order to solve the problem, an A/S manager needs to visit an operation field in which the construction machinery is actually located, and when the operation field is a remote region, an operation interruption time of the construction machinery is increased by the time taken for the A/S manager to visit.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is suggested in order to solve the aforementioned problems, and an object of some exemplary embodiments of the present disclosure is to provide an engine control apparatus for construction machinery which is capable of controlling the number of revolutions of an engine by using a jog shuttle when an engine control dial of the construction machinery has a problem or is erroneously operated.

In order to achieve the object, an engine control apparatus for construction machinery according to an exemplary embodiment of the present disclosure includes: an engine control dial manually operated by a user and configured to generate a control signal for increasing and decreasing revolutions per minute (rpm) of an engine by a predetermined unit; a jog shuttle including a jog switch, which is manually rotated and pressed by the user, and configured to generate a selection signal for selecting or changing functions corresponding to various operation modes; an instrument panel configured to display operation information of various elements which the user requires while driving the construction machinery; an engine controller configured to control the engine to respond to the control signal generated by the engine control dial; and an equipment controller configured to receive either the control signal generated by the engine control dial or the control signal corresponding to the rotation and the press of the jog switch, and provide the engine controller with a value of an rpm of the engine corresponding to the received control signal among values of the rpms of the engine corresponding to the respective control signals.

The instrument panel may provide an engine rpm adjustment screen image through use of the jog shuttle, the jog switch may output a rotation operation signal corresponding to a rotation angle by the rotation of the user and a selection operation signal corresponding to the press by the user on the instrument panel, and when the engine rpm adjustment screen image is called, the instrument panel may increase or decrease the value of the rpm of the engine displayed on the engine rpm adjustment screen image in response to the rotation operation signal, and then output a value of an rpm of the engine selected by the rotation to the equipment controller by the input of the selection operation signal.

When the engine rpm adjustment screen image is called, the instrument panel may display the value of the currently applied value of the rpm, and then display the value of the rpm of the engine so that the value of the rpm of the engine is increased or decreased from the value of the currently applied value of the rpm when the jog switch is operated.

The jog shuttle may generate an input value for increasing or decreasing a rpm of the engine according to a rotation angle of the jog switch when the engine control dial has a problem or is erroneously operated.

The equipment controller may include a switching unit which is switched so that a control signal for controlling an rpm of the engine is generated from the jog shuttle when the engine control dial is not normally operated, and the switching unit may be manually operated by a selection operation of the user, or automatically operated when the engine control dial has an error.

According to the present disclosure, the number of revolutions of an engine is controlled by using the jog shuttle when the engine control dial of the construction machinery has a problem or is erroneously operated, so that it is possible to normally use construction machinery before repair even though an emergency situation is generated.

DETAILED DESCRIPTION

The above-described objects, features and advantages will be described below in detail with reference to the accompanying drawings, and accordingly, the technical spirit of the present disclosure may be easily implemented by those having ordinary skill in the art. In describing the present disclosure, when it is judged that specific description about known technologies related to the present disclosure may unnecessarily obscure the essentials of the present disclosure, the detailed description will be omitted. Hereinafter, an exemplary embodiment according to the present disclosure will be described in detail with reference to the accompanying drawings.

Figure 1:
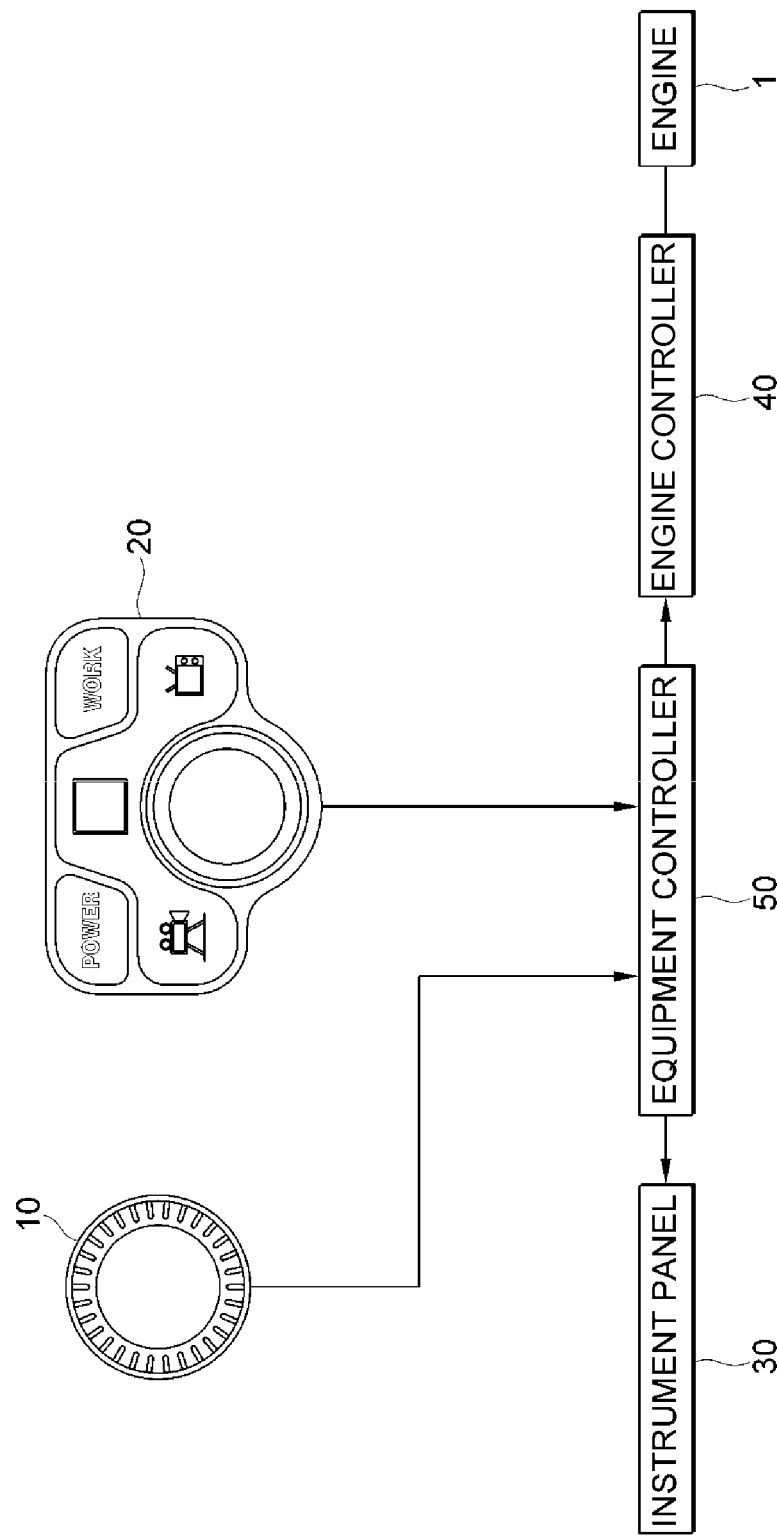
FIG. 1 is a configuration diagram illustrating a configuration of an engine control apparatus for construction machinery according to an exemplary embodiment of the present disclosure.
Figure 2:
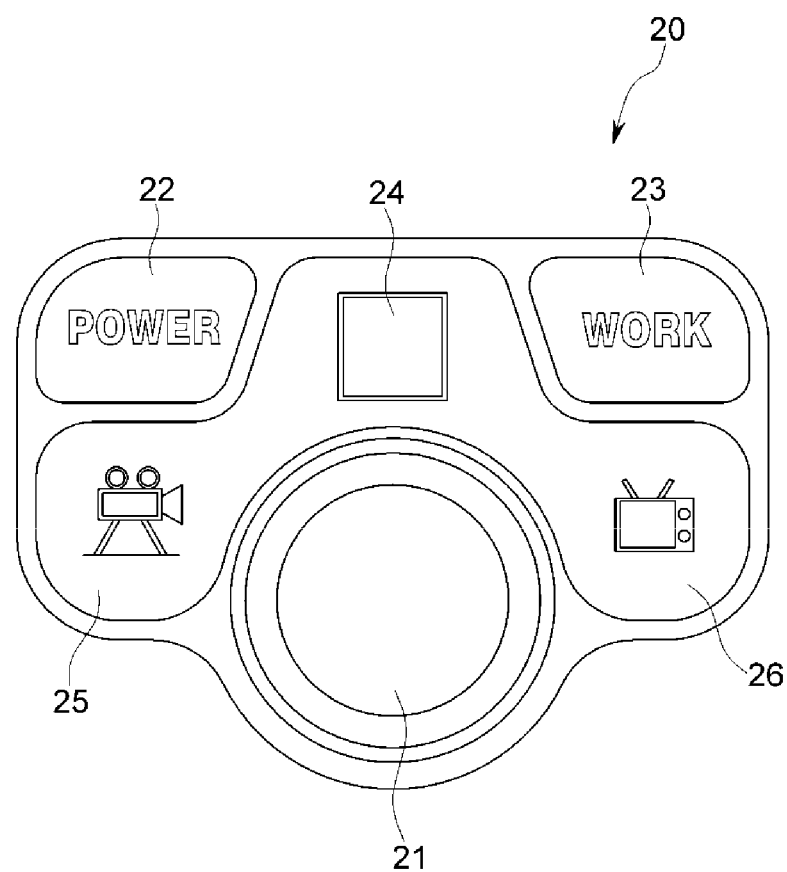
FIGS. 2 and 3 are diagrams illustrating a jog shuttle and an instrument panel in the engine control apparatus of FIG. 1, respectively.
Figures 3, 4:
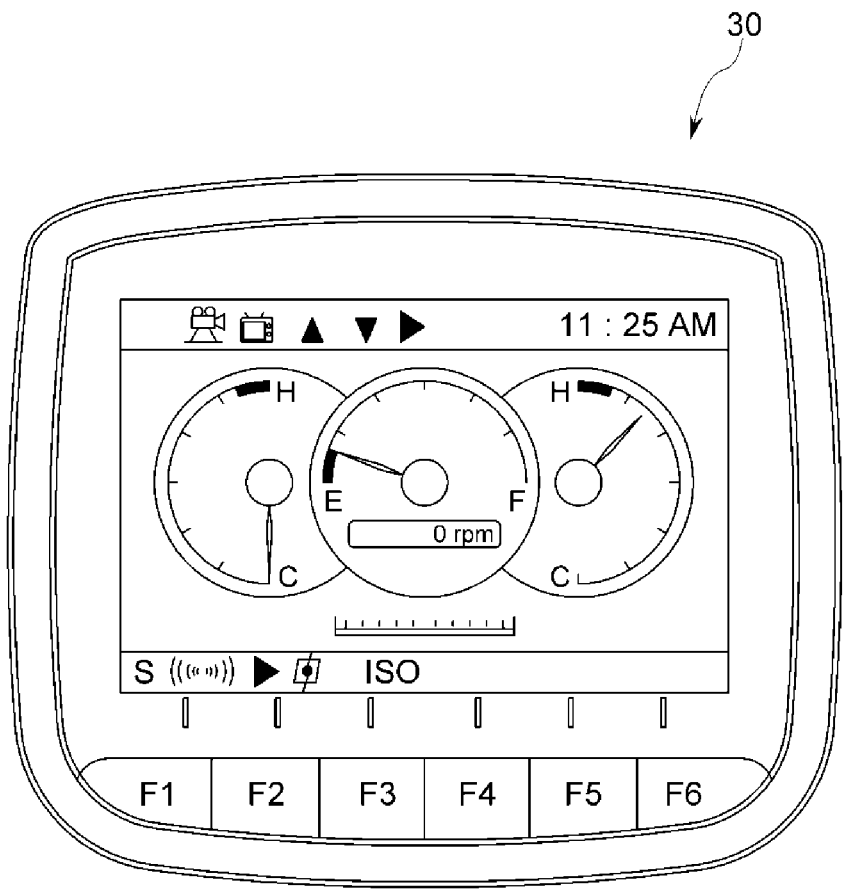
FIG. 4 is a diagram illustrating an input of an engine revolution number control signal from the jog shuttle in the instrument panel of FIG. 3.

FIG. 1 is a configuration diagram illustrating a configuration of an engine control apparatus for construction machinery according to an exemplary embodiment of the present disclosure, FIGS. 2 and 3 are diagrams illustrating a jog shuttle and an instrument panel in the engine control apparatus of FIG. 1, respectively, and FIG. 4 is a diagram illustrating an input of an engine revolution number control signal from the jog shuttle in the instrument panel of FIG. 3.

As illustrated in FIG. 1, an engine control apparatus for construction machinery according to an exemplary embodiment of the present disclosure includes an engine control dial 10 manually operated by a user to generate a control signal for increasing and decreasing revolutions per minute (RPM) of an engine 1 by a predetermined unit, a jog shuttle 20 manually operated by the user to generate a selection signal for selecting or changing functions corresponding to various operation modes, an instrument panel 30 for displaying operation information of various elements and the like which the user requires while driving the construction machinery, an engine controller 40 for controlling the engine 1 to respond to the control signal generated by the engine control dial 10, and an equipment controller 50 for receiving a control signal generated from the engine control dial 10, converting the received control signal to a corresponding value, and providing the engine controller 40 with the converted value, and switching an selection signal input of the jog shuttle 20 when the engine control dial 10 has a problem or is erroneously operated, and receiving a control signal for controlling the RPM of the engine from the jog shuttle 20, converting the received control signal to a corresponding value, and providing the engine controller 40 with the converted value.

That is, when the engine control apparatus for construction machinery according to the present disclosure is in a communication disable state with the equipment controller 50 due to damage, a problem, and the like of the engine control dial 10, the engine control apparatus may allow the jog shuttle 20 to provide the equipment controller 50 with a control signal for directly controlling the RPM of the engine.

The engine control dial 10 is provided in a driver cabin of the construction machinery so that the user may operate a desired RPM of the engine, and is generally formed in a rotary lever, and the RPM of the engine 1 may be set to 1,000 rpm, 1,500 rpm, 2,000 rpm, 2,500 rpm, and the like according to a rotation angle. Here, the set value is converted to a voltage value and applied to the equipment controller 50.

Further, the RPM of the engine settable through the engine control dial 10 may be increased and decreased by a predetermined uniform unit, and may be variously altered and change per unit of a minimum of 1 rpm.

The jog shuttle 20 is a combined operation switch, which is provided in the driver cabin of the construction machinery, in which switches for selecting an operation mode or various functions of the construction machinery are concentratively disposed, through which the user may perform a simple operation by using jog and shuttle, and includes a plurality of input buttons, more particularly, five pressure-type buttons and one pressure/rotation-type button (or a jog switch), so that a specific selection signal is input according to an operation of a corresponding button.

For example, as illustrated in FIG. 2, in the jog shuttle 20, when a jog switch 21 is pressed/rotated, a menu item on the instrument panel 30 may be selected or the setting value may be changed and set, when a power button 22 is pressed, a power plus mode, a power mode, a standard mode, an economy mode, and the like may be selected, when a work button 23 is pressed, an excavation mode, a lift mode, an attachment mode, and the like may be selected, when an auto idle button 24 is pressed, an idling operation function may be selected so that the RPM of the engine 1 automatically has an idling state, when a camera button 25 is pressed, a function for displaying an image photographed by a camera on the instrument panel 30 may be selected, and when a multimedia button 26 is pressed, a function for playing a video, music, or the like may be selected.

Here, when the engine control dial 10 has a problem or is erroneously operated, and the selection signal input of the jog shuttle 20 is switched by the equipment controller 50, the jog switch 21 may generate an input value for increasing or decreasing the RPM of the engine 1 according to a rotation angle as illustrated in FIG. 4.

The instrument panel 30 is a means for displaying operation information of various elements and the like, which the user requires during the driving of the construction machinery, and as illustrated in FIG. 3, may be divided into a display unit for displaying corresponding information through a fuel gauge, an engine thermometer, an oil thermometer, an ECO gauge, a clock, various warning symbols, and the like, and an input unit including function buttons in which various operation functions are preset.

The engine controller 40 controls the engine 1 to respond to a control signal generated from the jog switch 21 of the jog shuttle 20 by the switching of the engine control dial 10 or the equipment controller 50, and generates a driving control signal corresponding to the control signal to make the engine 1 be operated with a corresponding RPM.

The equipment controller 50 is a control means which receives a control signal generated by the engine control dial 10, converts the received control signal into a corresponding value, and provides the engine controller 40 with the converted value, which is electrically connected with the jog shuttle 20 when the engine control dial 10 has a problem or is erroneously operated, to receive a control signal for controlling an RPM of the engine from the jog shuttle 20, converting the received control signal into a corresponding value, and then provide the engine controller 400 with the converted value, and includes a switching unit driven so that the control signal for controlling the RPM of the engine is generated by the jog shuttle 20 when the engine control dial 10 is not normally operated.

Here, the switching unit may be configured so as to be manually operated by a selective operation of the user or automatically operated when the engine control dial 10 has an error, and on the former occasion, the switching unit is provided on the instrument panel 30 in a button type or separately provided in the driver cabin to be operated according to existence of selection of the user, and on the latter occasion, the switching unit may further include an element capable of separately detecting an error of the engine control dial 10.

Further, the equipment controller 50 includes a control algorithm configured as a database so that the RPM of the engine for the control signal may be controlled when the control signal for controlling the RPM of the engine is generated by the engine control dial 10 and the jog shuttle 20.

Here, the control algorithm includes controllable minimum and maximum RPMs in the operation of the engine 1, and values of the RPMs of the engine for each stage classified by the unit of a predetermined fraction within the range between the minimum RPM and the maximum RPM are preset in the control algorithm. Accordingly, when the user rotates the jog switch 21 of the jog shuttle 20, a value of the RPM of the engine for each stage corresponding to a value of the corresponding operation may be matched. That is, when it is assumed that the adjustable RPM of the engine is 500 rpm to 1,500 rpm, the minimum RPM of the engine is 500 rpm, and the maximum RPM of the engine is 1,500 rpm. When the range between 500 rpm to 1500 rpm is matched to the range of 0% to 100%, and a fraction is divided at every 10%, an algorithm in which next values of the minimum rpm of the engine are 600 rpm, 700 rpm, 800 rpm, . . . , 1,300 rpm, and 1,400 rpm may be applied. Accordingly, when the user rotates the jog switch 21, the value of the rpm of the engine increased or decreased by the predetermined fraction according to the rotation angle is output to the engine controller 40, thereby controlling the driving of the engine 1.

Further, when the generation of the erroneous operation of the engine control dial 10 is detected so that the control signal for the rpm of the engine needs to be generated from the jog shuttle 20 by the switching unit, the control algorithm may allow, as illustrated in FIG. 4, the input of the control signal for the rpm of the engine from the jog shuttle 20 through a pop-up or a screen switch to be selected on the instrument panel 30, and then display a value of the rpm of the engine corresponding to a value of the corresponding operation as a corresponding fraction when the jog switch 21 is rotated. In this case, the currently set value of the rpm of the engine may be further displayed on the instrument panel 30.

Hereinafter, an operation and an effect of the engine control apparatus for the construction machinery according to the exemplary embodiment of the present disclosure will be described.

The engine control apparatus for construction machinery according to the exemplary embodiment of the present disclosure usually controls the rpm of the engine by using the engine control dial 10, and when the engine control dial 10 is not normally operated, the user manually makes the switching unit of the equipment controller 50 be operated or the switching unit of the equipment controller 50 is automatically operated through separate sensing, so that the jog shuttle 20 is electrically connected with the equipment controller 50. Here, the user may manipulate the switching unit of the equipment controller 50 to be operated according to convenience of the user. That is, the rpm of the engine may be controlled by using the jog shuttle 20 regardless of the existence of a problem of the engine control dial 10. In this case, the rpm of the engine may be simultaneously input by the engine control dial 10 and the jog shuttle 20, and in this case, a signal input from the engine control dial 10 is first followed, thereby preventing the user from being confused and simplifying a control logic.

Then, the equipment controller 50 provides the instrument panel 30 with an engine rpm adjustment screen image illustrated in FIG. 4 through the control algorithm and makes the input of the control signal for the rpm of the engine from the jog shuttle 20 be selected, and then displays a value of the rpm of the engine corresponding to a value of the corresponding operation value with a corresponding fraction when the jog switch 21 is rotated, so as to make the user be recognized the currently controlled rpm of the engine, and output the value of the rpm of the engine corresponding to the control signal to the engine controller 40, thereby controlling the driving of the engine 1. A method of calling the engine rpm adjustment screen image of FIG. 4 may be configured as described below. The first example is a method of calling a corresponding screen image by operating the plurality of input keys disposed on the instrument panel 30. The second example is a method of calling a corresponding screen image by operating a separate selection switch disposed inside the driver cabin. The third example is a method of calling a menu selection screen image by pressing the jog switch 21, selecting an engine rpm control menu item by rotating the jog switch 21, and then pressing the jog switch 21 again to call the engine rpm adjustment screen image. When the engine rpm control screen image is called, the user increases or decreases the value of the rpm of the engine of the screen image until the desired rpm of the engine is displayed on the screen by generating a rotation operation signal by rotating the jog switch 21, and then generates a selection operation signal by pressing the jog switch 21 again, so that a signal corresponding to the selected rpm of the engine is output to the equipment controller 50, and thus the operation for the adjusting the rpm of the engine may be completed. The control signal corresponding to the operation of the jog switch 21 may be processed as a control signal to be input to the equipment controller 50 by the instrument panel 30, output from the instrument panel 30, and input to the equipment controller 50. To this end, the instrument panel 30 may include a calculation device and a memory for processing the control signal while being separately provided from a calculation device and a memory of the equipment controller 50. The aforementioned instrument panel may first display a value of a rpm of the engine currently applied to the equipment when the engine rpm adjustment screen image is called. The reason is that since a rotation range of the jog switch is not limited, a value of a rpm of the engine corresponding to a current posture of the jog switch cannot be displayed. Accordingly, the user may select a desired value of the rpm of the engine by rotating the jog switch so that the value of the rpm of the engine is increased from the value of the rpm of the engine currently displayed on the screen after calling the engine rpm adjustment screen image.

Accordingly, as described above, even though the engine control dial 10 has a problem or is erroneously operated, the user may control a rpm of the engine 1 by using the jog shuttle 20.

The technical spirit of the present disclosure has been specifically described according to the exemplary embodiments, but it is to be noted that the embodiments are provided for the description thereof and are not for the limitation thereof. Further, those skilled in the art will appreciate that various modifications may be made without departing from the scope and spirit of the present disclosure.

The invention claimed is:

1. An engine control apparatus for construction machinery, comprising:
    an engine control dial manually operable by a user and configured to generate a control signal for increasing and decreasing revolutions per minute (rpm) of an engine of construction machinery by a predetermined unit;
    a jog shuttle including a jog switch, which is manually rotatable and pressable by a user, and configured to generate a selection signal for selecting or changing functions corresponding to various operation modes of the construction machinery;
    an instrument panel configured to display operation information of various elements which is viewable to a user while driving the construction machinery;
    an engine controller configured to control the engine to respond to the control signal generated by the engine control dial; and
    an equipment controller configured to:
    receive the control signal generated by the engine control dial or a control signal corresponding to a rotation and a press of the jog switch; and
    provide the engine controller with a value of an rpm of the engine corresponding to the received control signal among values of the rpms of the engine corresponding to the respective control signals,
    wherein the instrument panel provides an engine rpm adjustment screen image through use of the jog shuttle,
    wherein the jog switch outputs a rotation operation signal corresponding to a rotation angle of a manual rotation by the user and a selection operation signal corresponding to a manual press by the user on the instrument panel, and
    wherein when the engine rpm adjustment screen image is called, the instrument panel increases or decreases the value of the rpm of the engine displayed on the engine rpm adjustment screen image in response to the rotation operation signal, and then outputs a value of an rpm of the engine selected by the manual rotation to the equipment controller by the input of the selection operation signal.

2. The engine control apparatus of claim 1, wherein when the engine rpm adjustment screen image is called, the instrument panel displays the value of the currently applied value of the rpm, and then displays the value of the rpm of the engine so that the value of the rpm of the engine is increased or decreased from the value of the currently applied value of the rpm when the jog switch is operated.

3. The engine control apparatus of claim 1, wherein the jog shuttle generates an input value for increasing or decreasing a rpm of the engine according to a rotation angle of the jog switch when the engine control dial has a problem or is erroneously operated.

4. The engine control apparatus of claim 1, wherein the equipment controller includes a switching unit which is switchable so that a control signal for controlling an rpm of the engine is generated from the jog shuttle when the engine control dial is not normally operated, and
    the switching unit is manually operable by a selection operation of the user, or automatically operable when the engine control dial has an error.

* * * * *